(12) United States Patent
Aquino Maier et al.

(10) Patent No.: US 11,579,264 B2
(45) Date of Patent: *Feb. 14, 2023

(54) OPTOELECTRONIC SENSOR, METHOD AND VEHICLE

(71) Applicant: Robert Bosch GmbH, Stuttgart (DE)

(72) Inventors: Daniel Aquino Maier, Stuttgart (DE); Matthias Wichmann, Gaertringen (DE); Oliver Kern, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 504 days.

This patent is subject to a terminal disclaimer.

(21) Appl. No.: 16/715,165

(22) Filed: Dec. 16, 2019

(65) Prior Publication Data

US 2020/0200881 A1 Jun. 25, 2020

(30) Foreign Application Priority Data

Dec. 21, 2018 (DE) ...................... 10 2018 222 718.7

(51) Int. Cl.
*G01S 7/4863* (2020.01)
*G01S 17/58* (2006.01)
(Continued)

(52) U.S. Cl.
CPC .......... *G01S 7/4863* (2013.01); *G01S 7/4914* (2013.01); *G01S 17/08* (2013.01); *G01S 17/58* (2013.01); *G01S 17/89* (2013.01)

(58) Field of Classification Search
CPC ...... G01S 7/4863; G01S 7/4914; G01S 17/08; G01S 17/58; G01S 17/89; G01S 7/4911; G01S 7/4917; G01S 17/34; G01S 17/931
See application file for complete search history.

(56) References Cited

U.S. PATENT DOCUMENTS

| 8,659,748 B2 * | 2/2014 | Dakin .................. G01S 7/4814 356/482 |
| 2011/0205521 A1 * | 8/2011 | Mimeault ............... G01S 17/42 356/615 |

(Continued)

FOREIGN PATENT DOCUMENTS

| WO | 2018067158 | 4/2018 |
| WO | 2018160729 | 9/2018 |
| WO | 2018218003 | 11/2019 |

OTHER PUBLICATIONS

Martin, A. et al.: Photonic Integrated Circuit-Based FMCW Coherent LiDAR. In: Journal of Lightwave Technology, vol. 36, No. 19, 2018, pp. 4640-4645. https://ieeexplore.ieee.org/document/8367822.

*Primary Examiner* — Jared Walker
(74) *Attorney, Agent, or Firm* — Norton Rose Fulbright US LLP; Gerard Messina

(57) ABSTRACT

An optoelectronic sensor, including a transmitting unit for transmitting a plurality of optical signals in each case to a plurality of segments of an object, and a receiving unit that includes a first multichannel analog-digital converter device, including: an analog-digital converter unit; a plurality of signal processing channels, the signal processing channels of the plurality of signal processing channels in each case including: a detection antenna for receiving optical signals; and a modulator for generating an individual signal encoding. Signals of the plurality of signal processing channels, with individual signal encoding, are transmittable together to the analog-digital converter unit, are converted, and may be associated once again with the corresponding signal processing channels due to the individual signal encoding via algorithms.

11 Claims, 10 Drawing Sheets

(51) Int. Cl.
    *G01S 7/4914*     (2020.01)
    *G01S 17/89*     (2020.01)
    *G01S 17/08*     (2006.01)

(56) References Cited

U.S. PATENT DOCUMENTS

2017/0090031 A1*   3/2017   Bondy .................... G01S 17/32
2018/0003793 A1*   1/2018   Dowski, Jr. ............ G01C 21/20
2018/0123699 A1     5/2018   Fatemi et al.
2020/0319340 A1*  10/2020   Sun ........................ G01S 17/89

* cited by examiner

OPTOELECTRONIC SENSOR, METHOD AND VEHICLE

FIELD OF THE INVENTION

The present invention relates to an optoelectronic sensor, in particular a LIDAR sensor, a method for operating the sensor, and a vehicle.

BACKGROUND INFORMATION

There are various concepts for analyzing the surroundings by use of LIDAR sensors.

A frequently used approach is the so-called "macroscanner," in which a rotating macromirror having a diameter in the centimeter range guides the beam across the visual field (also referred to as the "field of view"). The relatively large beam diameter has advantages with regard to maintaining eye safety, since pupil diameters of 7 mm assumed in the standards (IEC 608125-1) capture only a fraction of the optical power contained in the beam. In addition, a larger beam diameter is more robust against scattering influences such as rain or dust.

Another system concept is the use of microscanners. These involve small mirrors having a diameter in the millimeter range (typically 1-3 mm), which are manufactured in MEMS technology and are able to oscillate in one or two axes in order to achieve a beam deflection.

In addition, LIDAR sensors having a barrel-shaped, shoebox-shaped, or can-shaped configuration are known from the related art. Furthermore, solid-state LIDAR (SSL) systems are currently being developed which for the beam deflection manage without mechanical movement, i.e., without a movable mirror. In addition to reduced costs, these systems may also have advantages with regard to vibration influences, which play a role in the automotive sector, among others. One approach of an SSL is based on beam deflection by so-called optical phase arrays (OPAs).

Here, the phase of individual antenna elements of an antenna array on a photonic chip is adapted in such a way that the superimposition of the portions of all antenna elements has an intensity maximum in the preferred direction. There are major challenges with this approach, including the precise setting of the phase for each individual element as well as suborders of the interference pattern that are irradiated in other directions. In addition, a scanning system is known from US 2017/0090031 A1, for example, based on two grids without a scanning element for the two-dimensional beam deflection.

LIDAR systems measure the distance of an object, for example by direct runtime measurement (also referred to as "direct time of flight" (dToF)) of the irradiated light pulse. A laser source emits a light pulse that is deflected onto an object via a suitable unit. The object reflects the light pulse, the reflected light pulse being measured and evaluated by a detector. When the runtime measurement is used, the system may ascertain the runtime based on the points in time of the emitted light pulse and the received light pulse, and via the speed of light may ascertain the distance of the object from the transmitter/detector. Other methods are based on an indirect runtime measurement by modulating the light intensity or the light frequency itself. One approach is the combination of frequency modulation and coherent detection (also referred to as coherent frequency-modulated continuous wave (FMCW)). WO 2018/067158 A1 in particular is relevant as technical knowledge in this regard.

SUMMARY OF THE INVENTION

According to a first aspect, the present invention relates to an optoelectronic sensor. An optoelectronic sensor may be understood in particular to mean a LIDAR sensor and/or a laser-based speed sensor and/or distance sensor. The optoelectronic sensor includes a transmitting unit that is configured for transmitting a plurality of optical signals in each case to a plurality of segments of an object. An object may be understood in particular to mean an object that is detectable by the optoelectronic sensor. The object is addressed in particular via a visual field of the sensor, pixels of the visual field in each case being assigned to segments of the plurality of segments of the object. The transmitting unit may in particular be configured for selectively transmitting via movable optical elements, for example mirrors, an optical signal to a segment of the object or to a pixel of a visual field that is associated with a segment of the object. In addition, the optoelectronic sensor according to the present invention includes a receiving unit that includes a first multichannel analog-digital converter device. In particular, the receiving unit may also include a plurality of multichannel analog-digital converter devices. The stated first multichannel analog-digital converter device includes an analog-digital converter unit, which may be configured for sampling electronic signals and converting them into digital signals, i.e., digitizing the electronic signals. A downstream signal processor, for example a CPU, carries out signal processing steps, which may include the customary FMCW signal processing steps known from the related art, except that an additional separation of the previously combined signals of the particular optical channels takes place. These signal processing steps may include, for example, a transformation method such as a Fourier transform method (a fast Fourier transform method, for example). In addition, the multichannel analog-digital converter device includes a plurality of signal processing channels, the signal processing channels of the plurality of processing channels each including a detection antenna that is configured for receiving optical signals. In particular, the detection antenna may be configured for receiving optical signals that are reflected from a segment of the plurality of segments of the object. In particular, any detection antenna that is configured for receiving laser radiation may be suitable as a detection antenna. In addition, a signal processing channel of the plurality of signal processing channels in each case includes a modulator that is configured for generating an individual signal encoding. In particular, the plurality of signal processing channels may include 2 to 1000, in particular 4 to 100, signal processing channels, particularly 4 to 16 signal processing channels. The particular signals of the plurality of signal processing channels may be transmitted together, with individual signal encoding that is generated by the modulator, to the analog-digital converter unit. In particular, the signals, with individual signal encoding, may be guided across a superimposition unit, for example an adder, and superimposed there before the signals, with individual signal encoding, are transmitted to the analog-digital converter unit. Wavelengths in the range of 1300 to 1600 nm and/or 840 to 1000 nm may be used for generating the signals for the optoelectronic sensor according to the present invention. In other words, a signal with individual signal encoding may be generated with the aid of the modulator, it being possible for the modulator, as a function of its configuration in the signal processing channel, to individually encode an optical signal and/or electronic signal. The particular signals from the various signal processing channels are thus distinguishable from one another. Due to the individual signal encoding in each case, the signals from the plurality of signal processing channels may, for example, be transmitted together into a single analog-digital converter unit, where the signals are digitized. After digitization in the analog-digital converter unit, the digitized signal is supplied to a signal processor. Due to the initial individualized encoding of the particular signals, the signal in question may be associated with a specific pixel, in particular via the Fourier transform or some other correlation method, such as cross-correlation using known codes. Due to the individual encoding of the particular signals initially generated, the signal, after being combined in the analog-digital converter, may be assigned to the originally received optical signal via the transformation, for example a fast Fourier transform and/or a cross-correlation. In this way, multiple pixels that are associated with received signals, which are reflected, for example, from multiple segments of the object, may be evaluated in an analog-digital converter unit. Costs may thus be saved, since a known configuration described at the outset, in which each signal processing channel is assigned to a particular analog-digital converter unit, may be dispensed with. In addition, due to the parallel evaluation of the reflected signals that are assigned to a particular pixel, the evaluation times may be shortened. The evaluation may be carried out in particular using an FMCW technology described at the outset. In particular, the FMCW-specific modulation of the transmitting unit is used for the distance and speed determination. In contrast, the modulators of the receiving unit according to the present invention are used to distinguish pixels from one another. Thus, within the combining unit, in particular interference takes place between the emitted optical signal and the received optical signal. This may be advantageous in order to associate the signals in question, which are assigned to pixels of a visual field, since, for example, an optical phase may also be modulated at a branched reference channel that opens into the combining unit, which is not possible for a dToF measurement in particular. However, compared to the related art it is advantageous, as stated above, that the number of analog-digital converters as well as the evaluation time are significantly reduced due to the fact that multiple pixels are sampled in parallel. Thus, each pixel may be provided with a longer evaluation time. In order to distinguishably modulate the signals, a modulation may include an amplitude modulation and/or a phase modulation, for example. Such a modulation may take place electronically and/or optically. An amplitude modulation may in particular include multiplication of a signal by 1 or 0 and/or −1 and 1. In such a binary modulation, for example for an evaluation of four pixels, with each signal processing channel being assigned to one pixel, four signal processing channels are required. At least two measurements are required for each signal processing channel in order to generate a distinguishable encoding for four signals of the particular signal processing channels, for each modulation. These signals may be superimposed for the analog-digital converter unit, and after the digitizing in the analog-digital converter unit, as described above, are distinguishable from one another and associatable with an original signal processing channel. According to the present invention, an optoelectronic sensor may thus be implemented in a compact and cost-effective manner, since large ranges (>100 m) as well as fairly large visual fields (>100°) and also high measuring rates (>1 megasample per second) are achievable due to the parallel evaluation of pixels. In addition, due to the above-described cost-effective parallelization with the aid of a multichannel analog-digital converter device, by use of a longer measuring time per pixel the signal-to-noise ratio of the optoelectronic sensor may be improved. Furthermore, for the same likelihood of detection the transmission power output may be reduced, which likewise results in cost savings. Moreover, a "pixel sampling rate" (addressed pixels of the visual field per unit of time) may be increased due to the parallelization according to the multichannel analog-digital converter device. In addition, wafer-based manufacture of the optoelectronic sensor according to the present invention is also possible.

The further descriptions herein contain advantageous refinements and embodiments of the present invention.

According to one advantageous refinement, the transmitting unit is configured for transmitting the optical signals to the object on a pixel-by-pixel and/or column-by-column and/or block-by-block basis, i.e., for each analog-digital converter device, according to an orientation of the detection antennas with respect to the visual field. The optoelectronic sensor according to the present invention therefore has the advantage that the above-described technical effects may be achieved via a plurality of illumination schemes of a visual field of the sensor. In particular, the transmitting unit, for example in combination with a further optical unit, in particular a lens system, may be configured for emitting a flash illumination pattern, i.e., a simultaneous illumination of the entire visual field, and/or a pixel-by-pixel illumination pattern and/or a column-by-column illumination pattern with regard to the pixels of a visual field of the optoelectronic sensor. Additionally or alternatively, the pixels of a visual field may be illuminated simultaneously. In other words, a group of pixels that corresponds to the number of signal processing channels of the optoelectronic sensor according to the present invention may be addressed, each signal processing channel in particular being associated with one pixel of a group.

According to one advantageous embodiment of the optoelectronic sensor according to the present invention, the transmitting unit may include a first diffractive optical element, the first diffractive optical element being configured for guiding, as a function of a variation of a wavelength that is emitted by the transmitting unit, an optical signal, corresponding to this wavelength, to various segments of the plurality of segments of the object. The diffractive optical element may be fixedly, immovably mounted on the optoelectronic sensor according to the present invention. In particular, an optical signal may be guided from the diffractive optical element, a grating, for example, to a mirror, for example a movable mirror, and back before the signal is guided to the object. The mirror may thus address a vertical or a horizontal visual field. In addition, it is possible to address a horizontal or a vertical visual field via the deflection on the grating or the diffractive optical element. In other words, the target position of the signal, i.e., the addressed pixel, may be changed or controlled by varying the emitted wavelength. In addition, an angle of a deflection of an optical signal by the diffractive optical element may result from a change in a grating constant and/or a grating phase of same. In particular, the transmitting unit may contain a laser source. Furthermore, for example, the transmitting unit may contain a lens element, for example a collimator and/or a lens, situated downstream from the laser source, the collimator and/or the lens being configured for generating a planar wavefront of the light that is emitted by the transmitting unit, it being possible to subsequently guide this planar wavefront to the first diffractive optical element. Via such a configuration, the direction of an emitted light beam may be controlled in a position-selective manner, in particular solely by varying a wavelength, without the need for rotating elements. The light may thus be controlled in particular in one dimension via the change in wavelength. The second dimension orthogonal thereto may be spanned in the focus plane of the lens, for example via a linear configuration of the signal channels. The lens allows each signal processing channel to address a different pixel in the visual field. According to the present invention, an SSL sensor having the above-described properties may thus be provided. For example, the signal processing channels of the multichannel analog-digital converter device may span one dimension. A second dimension may be spanned by a wavelength scan, in one advantageous specific embodiment the optoelectronic sensor according to the present invention being implemented as a coaxial system on a photonic integrated circuit (PIC). As an alternative to a change in wavelength, a beam deflection may also take place in the pupil via an adaptive diffractive optical element; this element changes its optical function, for example the beam deflection, for defined wavelengths as a function of a voltage, for example.

Alternatively, the signal processing channels of the multichannel analog-digital converter device may span one dimension. A one-dimensional beam deflection, such as a movable mirror, in a pupil of the lens may span a second dimension, it being possible to implement the optoelectronic sensor on a PIC as a coaxial system. In the case of a diffractive optical element, it may be a diffractive optical grating, for example. This grating may be manufactured in particular with the aid of MEMS technology and/or hologram technology and/or with the aid of embossing technology and/or hot forming technology and/or with the aid of LCD technology and/or lithography processes. In particular, the geometry of the grating may include a blazed grating (to maximize the efficiency in the main system and/or a binary grating, i.e., a discrete grating with stages of two defined levels, and/or a sinusoidal grating, in which the amplitude and/or phase of the grating have/has a sinusoidal structure, and/or a free-form grating or an aperiodic grating, i.e., a grating structure that is optimized for certain optical functions, and/or a grating that includes a holographic material.

According to another advantageous embodiment, the transmitting unit may include a first movable optical element, the first movable optical element being configured for guiding an optical signal on various segments of the plurality of segments of the object as a function of a proper motion. In other words, by use of the first movable optical element a certain pixel position of the visual field may be addressed for the signal emission, as a function of its proper motion. In particular, the first movable optical element includes a rotating element and/or a scanner. The term "scanner" means an optical element that deflects an optical beam in a defined spatial direction, and thus allows an area in the visual field to be addressed. In particular, the scanner may be configured as a 1D scanner and/or a 2D scanner. In addition, two one-dimensional scanners at a small distance from one another may likewise be used, one each for a horizontal visual field and for a vertical visual field. Furthermore, two one-dimensional scanners may also be used for a horizontal visual field and a vertical visual field with X:Y imaging between the scanners. Suitable in particular as movable optical elements are mirrors, in particular MEMS mirrors and/or galvo mirrors and/or cardanic mirrors or gimbal mirrors and/or macroscanners, a macroscanner including a sensor on a rotatable element and being configured for scanning a horizontal visual field, for example.

For example, the movable optical element and the diffractive optical element may be situated in succession. The movable optical element may deflect light beams onto the diffractive optical element, and vice versa. In addition, the diffractive optical element may be mounted on the movable optical element, such as a mirror.

According to another advantageous embodiment of the optoelectronic sensor according to the present invention, it is configured for carrying out a direct time of flight method, i.e., a direct runtime measuring method, and/or a combination of frequency modulation and coherent detection (FMCW method; see above definition), and/or a combination of phase modulation and coherent detection. In particular, for an FMCW method it may be provided that a modulated reference signal is branched from the transmission signal via a reference channel. In particular, a reference channel is connected to combining units which in particular are each situated in one of the signal processing channels of the plurality of signal processing channels. In other words, in particular a portion of a modulated signal that is emitted, for example as a local oscillator (i.e., as a modulated reference signal), is branched. The portion of this signal is interfered with by the received signal in the combining unit. The modulation of the laser and thus of the reference signal or received signal is used for ascertaining the distance and speed of an object, as is known from FMCW methods. The modulation of the modulators is used to distinguish the individual signal processing channels of the multichannel analog-digital converter device. In particular, the FMCW modulation of the transmitting unit results in a beat signal (during the superimposition of the local oscillator with the signals of the receiving unit) in which the distance and the speed of an object are encoded in a pixel. For example, a beat frequency may be determined via a fast Fourier transform.

Additionally or alternatively, a superimposition of multiple pixels of particular signal processing channels may result in a different behavior of the individual peaks, which may be determined by multiple measurements. Each peak may be associated with a signal processing channel. In this way, advantageous operation of an optoelectronic sensor with an improved signal-to-noise ratio and a longer measuring time per pixel may be provided, in particular by use of the first multichannel analog-digital converter device.

According to one advantageous refinement of the optoelectronic sensor according to the present invention, the transmitting unit and the receiving unit may be situated coaxially and/or biaxially with respect to one another. In particular, the transmitting unit and the receiving unit may be configured as a transceiver. Discrete systems and/or free beam systems and/or fiber-based systems and/or PICs are suitable here. In particular, for a coaxial configuration the transmitting unit and the receiving unit may include multiplexing of multiple lasers. Parallelization by multiple lasers, each with their own signal paths, may take place. The lasers may optionally have different central wavelengths. In particular, a biaxial configuration of the transmitting unit and of the receiving unit may correspond to the configuration in the coaxial variant described above. The difference is that the signal processing channels vary with regard to the location of the decoupling and of the reception, or of the location of the mounting of the detection antenna and a transmitting antenna. In addition, both of the variants described above may be situated within an optoelectronic sensor according to the present invention.

According to another advantageous embodiment, the sensor having a biaxial configuration of the transmitting unit and the receiving unit may include a second diffractive optical element and/or a second movable optical element, the second diffractive optical element and/or the second movable optical element each being configured for guiding incident optical signals to the detection antennas of the signal processing channels. In the case of a biaxial configuration, the second diffractive optical element or the second movable optical element may differ from the above-described first diffractive optical element or the first movable optical element with regard to its spatial configuration. In the other case, the first diffractive optical element and the second diffractive optical element, or the first movable optical element and the second movable optical element, may be identical.

According to another advantageous embodiment of the optoelectronic sensor according to the present invention, the receiving unit may include a second multichannel analog-digital converter device. This second multichannel analog-digital converter device has essentially the same structural features and properties as the first multichannel analog-digital converter device. For example, 10 to 20 signal processing channels may be provided for each multichannel analog-digital converter device. In addition, 2000 to 7000 multichannel analog-digital converter devices, each including 10 to 30 multichannel analog-digital converter devices, may be provided for a sensor that is operated with the aid of a flash method. Furthermore, LIDAR sensors according to the present invention may include a vertical configuration of multichannel analog-digital converter devices according to the present invention (4 to 16, for example), each including 8 to 32 signal processing channels. Moreover, a horizontal scanner that includes 10 to 20 multichannel analog-digital converter devices, each including 4 to 64 signal processing channels, is suitable.

According to another advantageous embodiment, the first multichannel analog-digital converter device addresses pixels of a visual field that are in parallel and/or alternating and/or diagonally offset with respect to pixels that are addressed by the second multichannel analog-digital converter device. Arbitrary combinations of the above-mentioned patterns are possible. In one specific embodiment, particularly advantageous patterns are characterized in that the pixels of the visual field associated with a multichannel analog-digital converter device may address what may be different distances. In particular, patterns are used, for example, in which pixels associated with one of the multichannel analog-digital converter devices may be far apart in the vertical visual field. For 10 multichannel analog-digital converter devices, each with 16 signal processing channels and a vertical visual field of 0° to 24°, a first multichannel analog-digital converter device addresses pixels in the range of 0° to 22.5° (in 1.5° increments, for example), and the second multichannel analog-digital converter device addresses the pixels in the range of 0.15° to 22.65° (in 1.5° increments, for example). The subsequent multichannel analog-digital converter devices are always shifted by 0.15°, so that the tenth multichannel analog-digital converter device addresses the angles 1.35° to 24° (in 1.5° increments, for example).

In certain cases it may also be advantageous for the signal processing channels belonging to a multichannel analog-digital converter device to address what may be adjacent pixels in the visual field, for example to improve the signal-to-noise ratio. In one specific embodiment, for example three multichannel analog-digital converter devices may be provided here, a first multichannel analog-digital converter device addressing an angular range of 0° to 10°, a second multichannel analog-digital converter device addressing an angular range of 10° to 20°, and a third multichannel analog-digital converter device addressing an angular range of 20° to 30°. As an addition or an alternative to these angular ranges, this may also take place for distance ranges of <50 m, 50 m to 100 m, and 150 m to 200 m, respectively.

The following variants are described with regard to the configuration of the first and/or second and/or further multichannel analog-digital converter devices according to the present invention:

According to a first variant, the signal processing channels of the plurality of signal processing channels each include a photodetector, in particular a photodiode and/or a balanced detector, the photodetector being configured for converting optical signals into electronic signals, and/or a combining unit, the combining unit being configured for combining the optical signals, received by the detection antennas, with a modulated reference signal.

According to a second variant that is combinable with the first variant, the modulator is in each case situated in at least one signal processing channel of the plurality of signal processing channels, between the detection antenna and the combining unit, and/or between the branched signal from a branched reference channel and the combining unit, and/or between the combining unit and the photodetector, and/or between the photodetector and the analog-digital converter unit.

In a third variant that is combinable with the above variants, a plurality of the detection antennas of the plurality of signal processing channels are each oriented in different spatial directions.

According to a fourth variant that is combinable with the above-mentioned variants, at least one modulator of the plurality of signal processing channels is configured for modulating an amplitude and/or a phase of the optical signal and/or of the signal combined in the combining unit and/or of the signal detected in the photodetector. Such a modulation may take place with regard to either an optical signal and/or an electronic signal. In particular, in the case of an amplitude modulation, an amplitude may be multiplied by 0 or 1, or −1 and 1, in a binary manner. In addition, a modulation of the phase by 0° and/or 90° and/or 180° may take place. In particular, an adjustable attenuation and/or amplification element and/or a thermal phase shifter and/or an electrical phase shifter are/is suitable as a modulator.

According to a fifth variant that is combinable with the above-mentioned variants, a multichannel analog-digital converter device according to the present invention includes a signal superimposition unit that is configured for superimposing the signals with individual signal encoding prior to their transmission into the analog-digital converter unit.

According to a sixth variant that is combinable with the above-mentioned variants, the analog-digital converter unit is configured for generating a digital signal. Transformation of the signals may take place with the aid of a signal processor situated downstream from the analog-digital converter unit.

The following aspects according to the present invention include the advantageous embodiments having the above-mentioned features as well as the general advantages of the optoelectronic sensor according to the present invention and the associated technical aspects in each case. Therefore, the discussion is not restated in order to avoid repetition.

According to a second aspect, the present invention relates to a vehicle, in particular an automobile, that includes an optoelectronic sensor according to the first aspect of the present invention. Automobiles, in particular passenger vehicles, and/or self-driving taxis and/or trucks and/or autonomous transport systems and/or motorcycles and/or aircraft and/or ships are examples of suitable vehicles within the meaning of the present invention. However, the present invention also relates to autonomous robots for industrial and consumer applications.

According to a third aspect, the present invention relates to a method for signal modulation in an optoelectronic sensor. The method may be carried out as an FMCW method and/or dToF method. The method includes the step of transmitting an in particular modulated optical signal to multiple pixels of a visual field. In a second step, the method includes receiving reflected optical signals regarding multiple pixels via a multichannel analog-digital converter device described above, in each case via a signal processing channel from the plurality of signal processing channels. In particular, a premodulated reference signal of the transmitted modulated optical signal is combined with the received signal (in the case of an FMCW method) in a further step. This may take place in the combining unit, for example. In particular, the received signals are modulated in a further step in order to generate an individually encoded analog signal. This may take place in particular via the measures described above. The individually encoded analog signals are superimposed with one another in a further step. This may take place, for example, by use of a superimposition unit. In particular, the superimposed and encoded signals are subsequently transmitted together into an analog-digital converter unit, where they are digitized. The digitized signals are transformed by use of a transformation method, in particular multiple times, for example with the aid of a fast Fourier transform method, by a signal processor so that the digital signals may be distinguished from one another and the distance and/or speed information may be ascertained. In particular, a fast Fourier transform results in peaks that contain information concerning distance and speed. A pixel assignment with respect to a visual field may be determined by modulating these peaks with multiple measurements. In other words, an evaluation of the transformed, superimposed signals takes place in order to associate them with the particular pixel. The distance and the speed of an object in each pixel may thus be associated within this step, using known technical methods. Ascertaining the distance and speed may take place based largely on methods known to those skilled in the art. In particular, a spectrum is ascertained based on superimposed digital signals with the aid of a signal processor, with a search for the frequency maxima. For a parallelization of four signal processing channels, for example, in particular four peaks are present in a spectrum. The frequency of the maxima of these peaks corresponds to a linear combination of a "range frequency" and a Doppler frequency. The allocation of the particular maxima to the signal processing channels subsequently takes place according to the present invention via the individual signal encoding.

Exemplary embodiments of the present invention are described in greater detail below with reference to the appended drawings.

DETAILED DESCRIPTION

Figure 1:
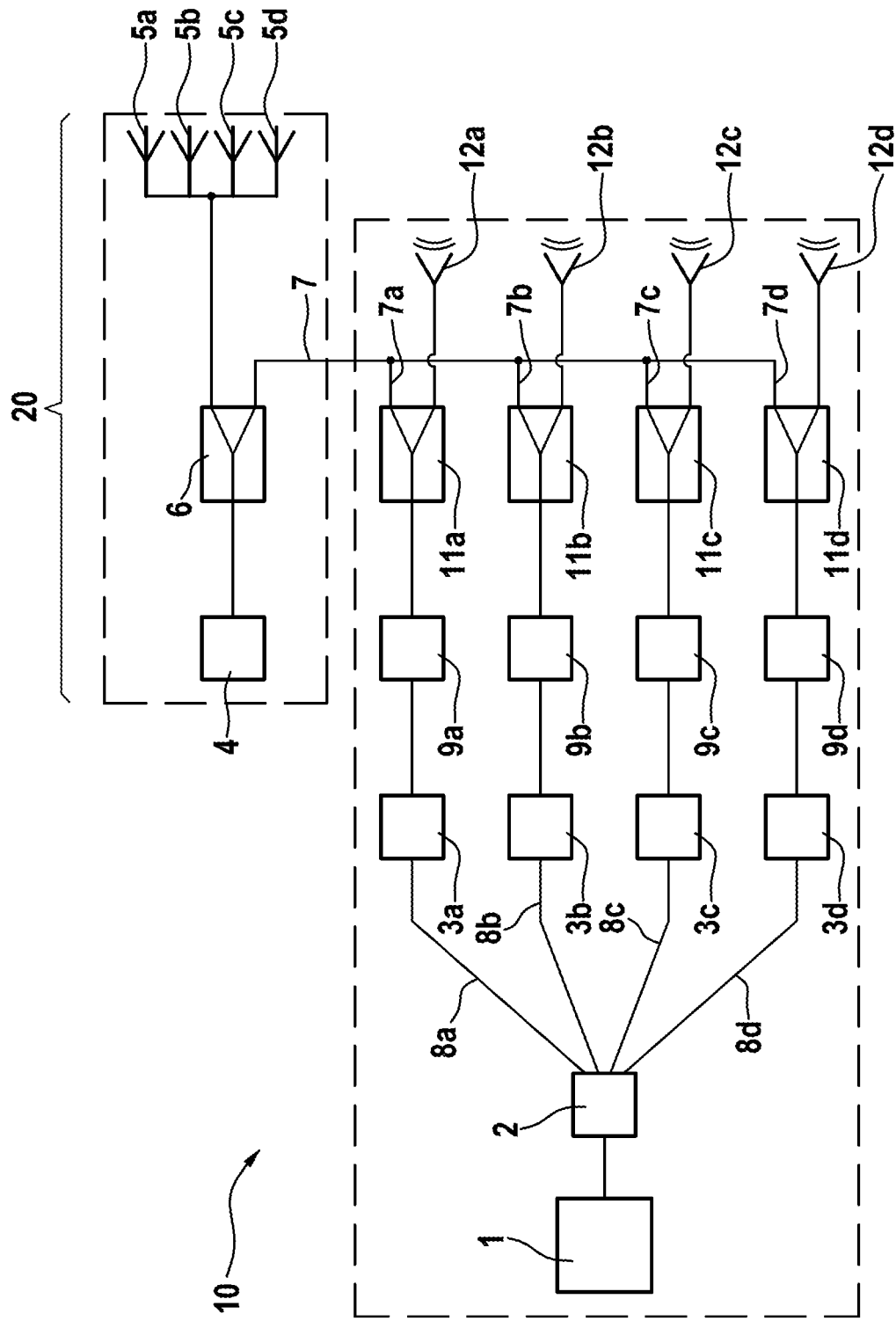
FIG. 1 shows one variant of the first multichannel analog-digital converter device according to the present invention.

FIG. 1 shows an illustration of one variant of multichannel analog-digital converter device 10 according to the present invention. Multichannel analog-digital converter device 10 according to the present invention includes a transmitting unit 20. Transmitting unit 20 includes at least one laser source 4 and a branching unit 6, the latter being configured for transmitting optical premodulated signals of laser source 4 to a first through fourth transmitting antenna 5a through 5d, and branching a branched signal into reference channel 7. In particular, multichannel analog-digital converter device 10 according to the present invention is operated using an FMCW method. Laser source 4 generates a modulated optical signal that is emitted to a pixel of a visual field via one of first through fourth transmitting antennas 5a through 5d. For associating the emitted reference signal with respect to one of the reflected signals that is received via first through fourth detection antennas 12a through 12d, in one of first through fourth combining units 11a through 11d a premodulated reference signal, via reference channel 7, is combined with the reflected signals that are received via the first through fourth detection antennas, in order to associate the received signals with the transmitted signal. In particular, four branched reference channels 7a through 7d are present in which a modulator 3a through 3d may likewise be situated. In particular, first through fourth transmitting antennas 5a through 5d are associated with different pixels. First through fourth detection antennas 12a through 12d receive the signals reflected from the particular segments of an object corresponding to particular transmitting antenna 5a through 5d. For example, first detection antenna 12a receives the signal, originally emitted by first transmitting antenna 5a, that is reflected from the object. In addition, second detection antenna 12b receives the signal that was originally transmitted by second transmitting antenna 5b to another segment of the object, etc. Each detected signal is transmitted to one of first through fourth signal processing channels 8a through 8d via detection antennas 12a through 12d. The analog optical signals are converted into electronic signals in first through fourth detectors 9a through 9d, in particular balanced detectors. The signals that are guided via respective first through fourth signal processing channels 8a through 8d are individually encoded by first through fourth modulator 3a through 3d, so that all signal encodings are individually distinguishable from one another. When, in the present case, first through fourth modulators 3a through 3d use binary encoding, for example, and the modulation is an amplitude modulation, for example, the amplitudes of the particular signals within the first through fourth modulators may be multiplied by −1 or 1, for example, for each measurement. Accordingly, for four differently addressed pixels, for each analog-digital converter unit 1, two measurements per signal processing channel 8a through 8d are necessary in order to generate a distinguishable encoding for each signal. A signal is multiplied by a binary number for each measurement. For four signals that are received via first through fourth detection antenna 12a through 12d, in particular the first signal, which is received via first detection antenna 12a, is modulated with the binary sequence "−1, −1" within first modulator 3a, and the second signal, which is received via second receiving antenna 12b, is modulated with the binary sequence "−1, 1" within second modulator 3b, and the third signal, which is received via third detection antenna 12c, is modulated with the binary sequence "1, −1" within third modulator 3c, and the fourth signal, which is received via detection antenna 12d, is modulated with the binary sequence "1, 1" within fourth modulator 3d. Thus, all signals may be modulated with individualized encoding. In other words, to allow four different pixels, which belong to first through fourth detection antennas 12a through 12d of first through fourth signal processing channels 8a through 8d, to be distinguished from one another, at least two measurements must be carried out, using an above-described binary encoding for each pixel and for each antenna. All encoded signals are then superimposed with one another in a signal superimposition unit 2. The signals are subsequently transmitted to analog-digital converter unit 1 in order to digitize them. These signals are subjected to a Fourier transform in a downstream signal processor, and after a Fourier transform, for example, may be distinguished from one another due to the initially individualized encoding.

The modulation of the laser, and thus of the emitted signal and the reference channel, is used to measure the distance of an object in a specific pixel. Additionally or alternatively, the speed may be determined in addition to the distance.

Figure 2A:
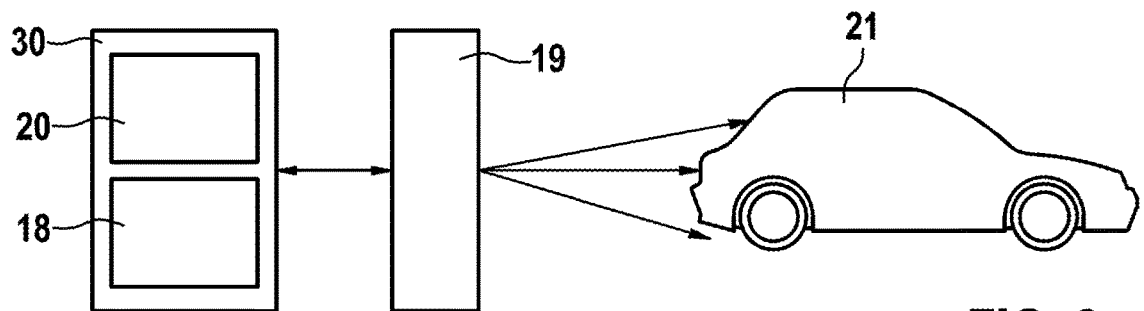
FIG. 2a shows a schematic illustration of a LIDAR sensor according to the present invention.

FIG. 2a shows a LIDAR sensor 30 according to the present invention, which includes a transmitting unit 20 for transmitting optical signals and a receiving unit 18 for receiving optical signals. An optical element 19 for transmitting unit 20 and receiving unit 18 may be provided for controlling the path of the optical signals. An object 21 is scanned in this way. LIDAR sensor 30 according to the present invention may include a 1D scanner and a 2D scanner, for example, in order to scan a two-dimensional visual field and thus generate three-dimensional images.

Figure 2B:
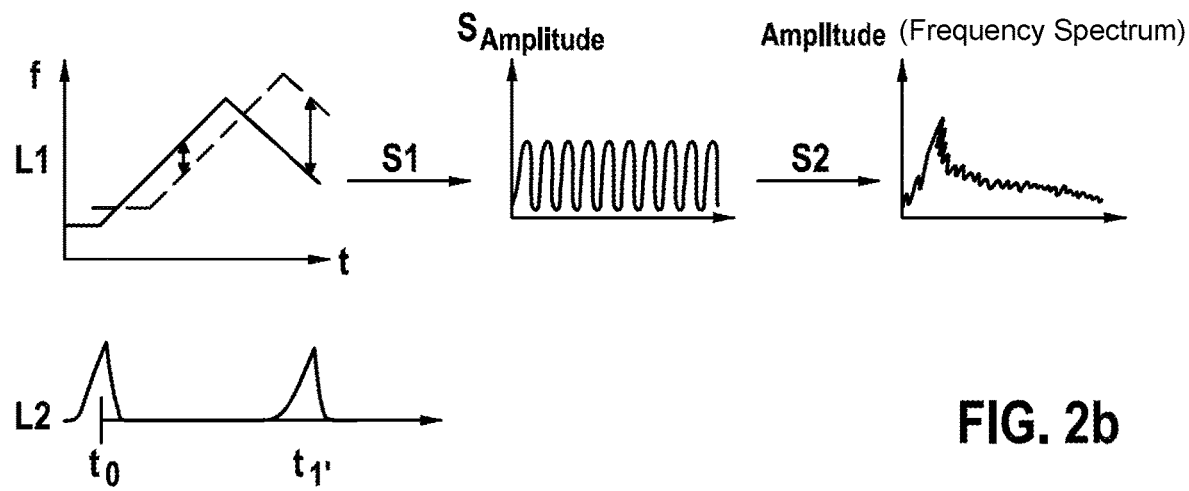
FIG. 2b shows an illustration of methods according to the present invention for operating a LIDAR sensor according to the present invention.

FIG. 2b shows illustrations of measurements for two methods L1, L2 for distance measurement by LIDAR sensor 30 according to the present invention. First method L1 is an FMCW method in which, for a changing optical frequency of a laser of a transmitting unit 20, a beat frequency is generated between the transmitted signal and the received signal, the beat frequency being a function of the light propagation time and thus allowing a determination of the distance. This signal is converted into an electronic signal in step S1. The electronic signal is subsequently digitized, as illustrated for step S2. For example, a transformation may be carried out for the digitized signal, the graphical result of which is indicated in the third image from the left in FIG. 2b for step L1. For example, a fast Fourier transform is appropriate. Step L2 in FIG. 2b shows a temporal signal curve for a direct runtime measurement (DToF). After the signal is emitted at first point in time t0, the received signal may be received at second point in time t1. A distance of an object may be determined via the runtime difference between the transmitted signal and the received signal.

Figure 3:
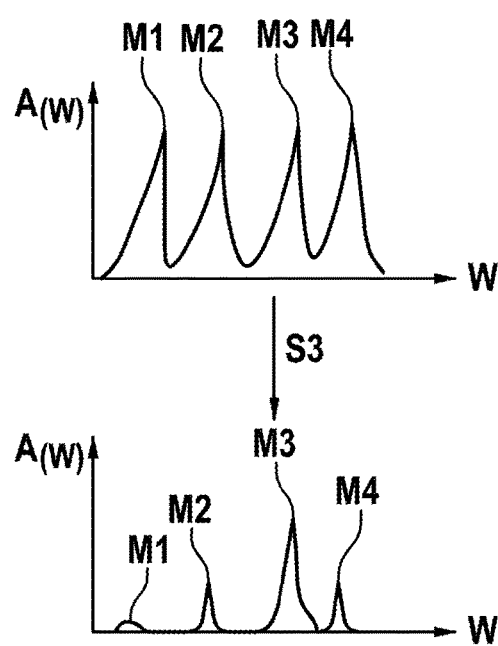
FIG. 3 shows an illustration of an evaluation method.

FIG. 3 shows an illustration of Fourier-transformed spectra, which may be used to associate digitized signals with an original signal with individual signal encoding. The top area of FIG. 3 shows the graphical result of a previously performed Fourier transform of various signals M1 through M4 of different signal processing channels. Different peaks, i.e., peaks having different amplitudes, for example, of different detected signals M1 through M4 may be generated via modulators 3a through 3d via a further Fourier transform in a step S3. Signals M1 through M4 may be assigned to the originally modulated analog signal encodings via a mini-Fourier transform filter.

Figure 4:
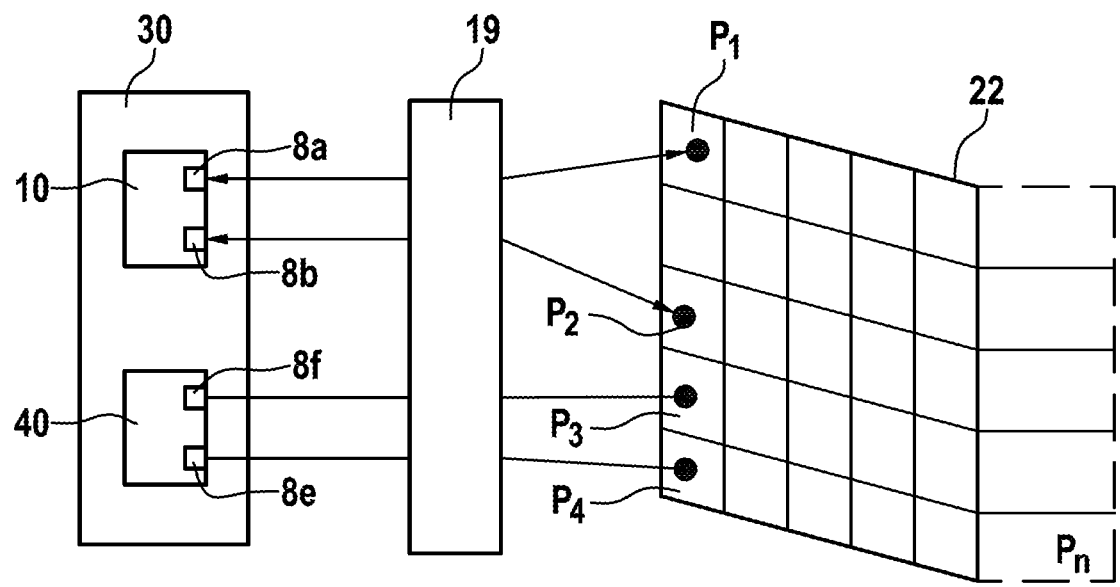
FIG. 4 shows an illustration of an operating principle of one specific embodiment of the optoelectronic sensor according to the present invention.

FIG. 4 shows a LIDAR sensor 30 according to the present invention which includes a multichannel analog-digital converter device 10 according to the present invention. Two detection antennas 8a, 8b are shown. In addition, LIDAR sensor 30 according to the present invention includes a second multichannel analog-digital converter device 40, of which two signal processing channels 8e, 8f are shown. With the aid of an optical element 19 that is configured for carrying out a spatial signal deflection, particular signal processing channels 8a, 8e of first and second multichannel analog-digital converter devices 10, 40 according to the present invention may be assigned to various pixels P1 through Pn of a visual field 22 after the optical signals are transmitted. In other words, signal processing channels 8a, 8b, 8e, 8f of first and second multichannel analog-digital converter devices 10, 40 according to the present invention may address various pixels P1 through Pn.

Figure 5:
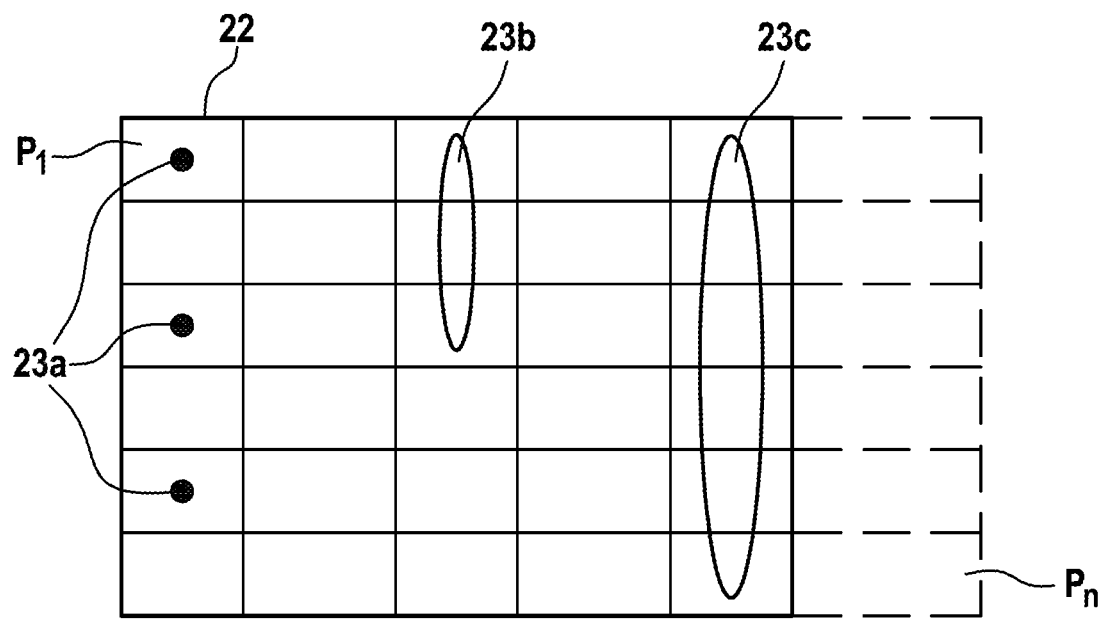
FIG. 5 shows an illustration of illumination patterns with regard to a visual field.

FIG. 5 shows different variants of pixel associations within a visual field 22. In other words, an illumination scheme of a visual field 22 is shown. First illumination scheme 23a relates to a pixel-by-pixel illumination of visual field 22. Second illumination scheme 23b relates to an illumination that is associated with the number of signal channels of a multichannel analog-digital converter device 10 according to the present invention. In addition, FIG. 5 shows a third illumination scheme 23c of a visual field 22, third illumination scheme 23c relating to a column-by-column illumination.

Figure 6:
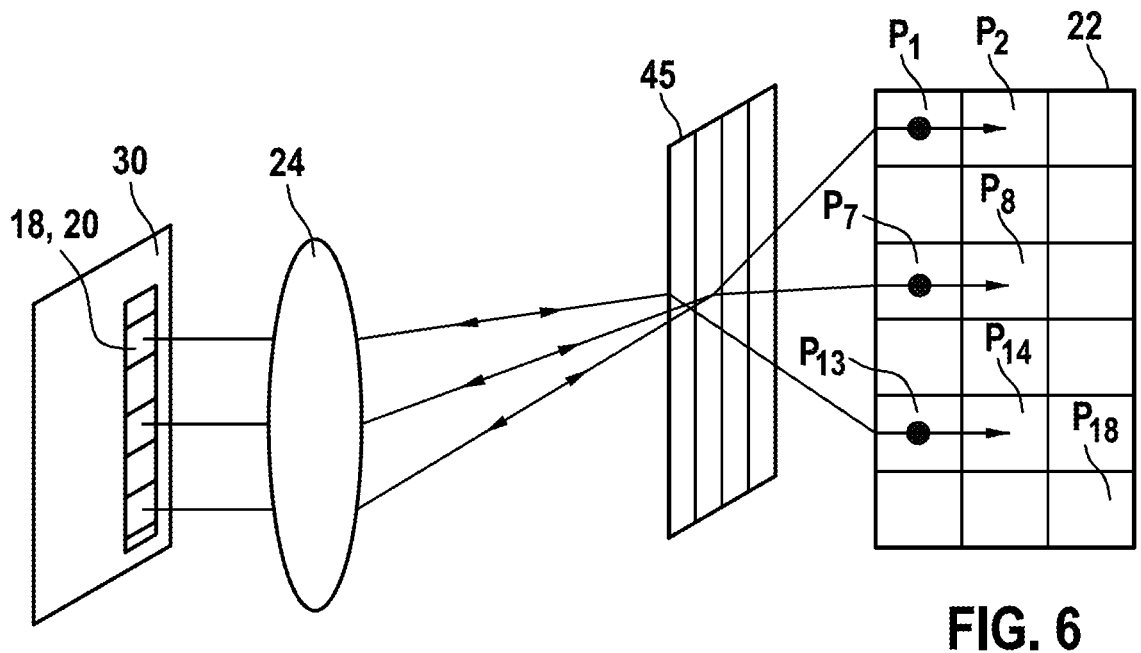
FIG. 6 shows one variant of the optoelectronic sensor according to the present invention including a diffractive optical element.

FIG. 6 shows one embodiment of a LIDAR sensor 30 according to the present invention. LIDAR sensor 30 according to the present invention includes a combined transmitting and receiving unit 18, 20, receiving unit 18 including a multichannel analog-digital converter device 10, 40 according to the present invention, not shown here. For example, transmitting unit 20 and receiving unit 18 may have a coaxial configuration, i.e., as a transceiver. A collimator 24 is situated between LIDAR sensor 30 according to the present invention and visual field 22, which is associated with an object 21. The task of collimator 24 in particular is to generate a planar wavefront of the light. Instead of collimator 24, in one specific embodiment a lens, in particular an f-theta lens, in particular a telecentric f-theta lens, may be used. These lenses transform the different locations of the transceiver inputs/outputs in the focus plane, or in a small distance around same, into different exit angles in the pupil of the lens. The signals emitted by transmitting and receiving unit 18, 20 are deflected via a diffractive optical element 45 onto various pixels P1, P7, P13 of the total number of pixels P1 through P18 of visual field 22. The particular signals reflect on the surface of an object that is assigned to particular pixel P1 through P18. The reflected signals follow the same path as the emitted signals back to transmitting-receiving unit 18, 20. This is shown in FIG. 6 by the bidirectional arrows that are associated with the signal paths. Different deflections may take place on diffractive optical grating 45 as a function of a variation in the wavelength; by varying the wavelength in the laser source of transmitting unit 18, the beams are guided, for example, from the first pixel to the second pixel, from the seventh pixel to the eighth pixel, and from the 13th pixel to the 14th pixel, as illustrated in FIG. 6. In one particular specific embodiment, one dimension is completely covered by one or multiple multichannel analog-digital converter devices, and the second dimension is addressed via a wavelength scan. A solid-state LIDAR, i.e., a LIDAR sensor without moving parts, is implemented in this way.

In another particular specific embodiment, one dimension is completely covered by one or multiple multichannel analog-digital converter devices, and the second dimension is addressed via changes in the state of an adaptive diffractive element. A solid-state LIDAR, i.e., a LIDAR sensor without moving parts, is implemented in this way. In particular, the decision regarding which signal processing channels, corresponding to certain pixels, are to be connected to form a multichannel analog-digital converter device 10 may be made via the configuration of the electronics system. Arbitrary patterns may thus be combined to form a multichannel analog-digital converter device 10.

Figure 7:
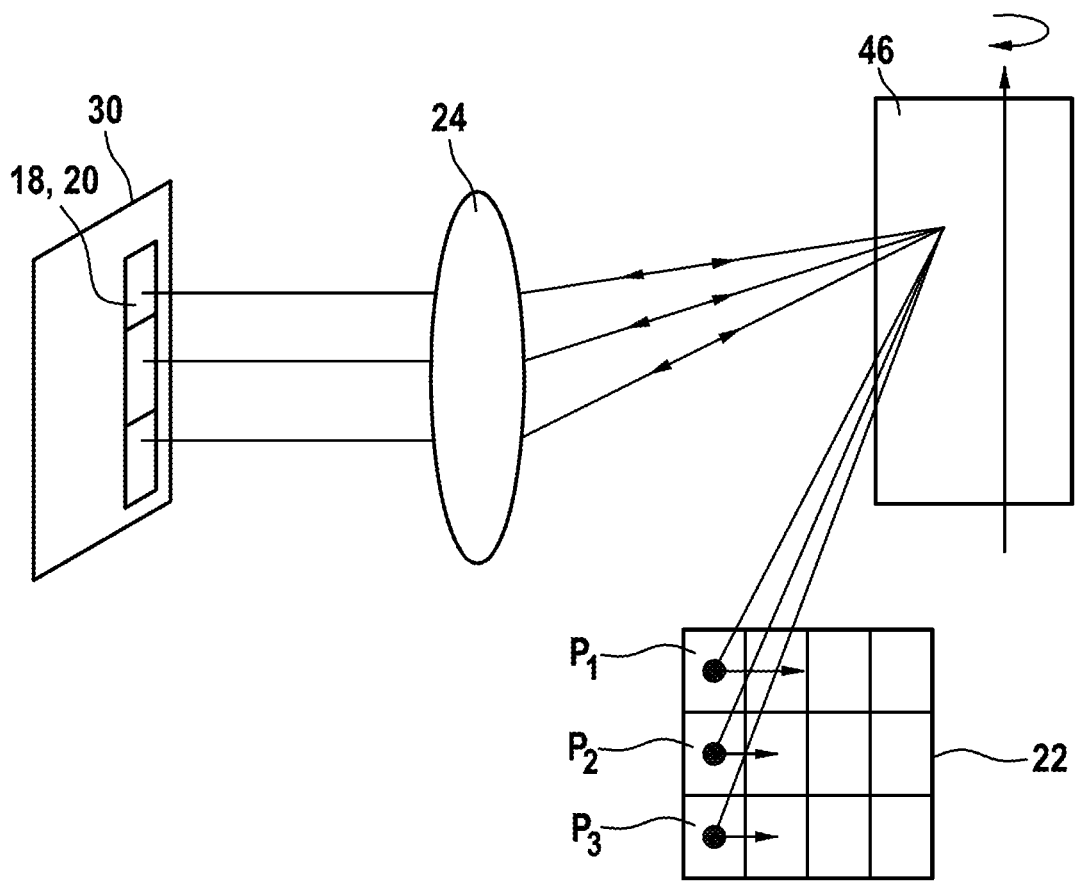
FIG. 7 shows one variant of the optoelectronic sensor including a movable optical element.

FIG. 7 shows one variant of a LIDAR sensor 30 according to the present invention. FIG. 7 differs from FIG. 6 in that the signals are deflected onto a visual field 22 via a movable mirror 46. The addressing of pixels P1, P5, P9 by the signals, as illustrated by the arrows in the indicated visual field, may be changed by moving the mirror.

Figure 8A:
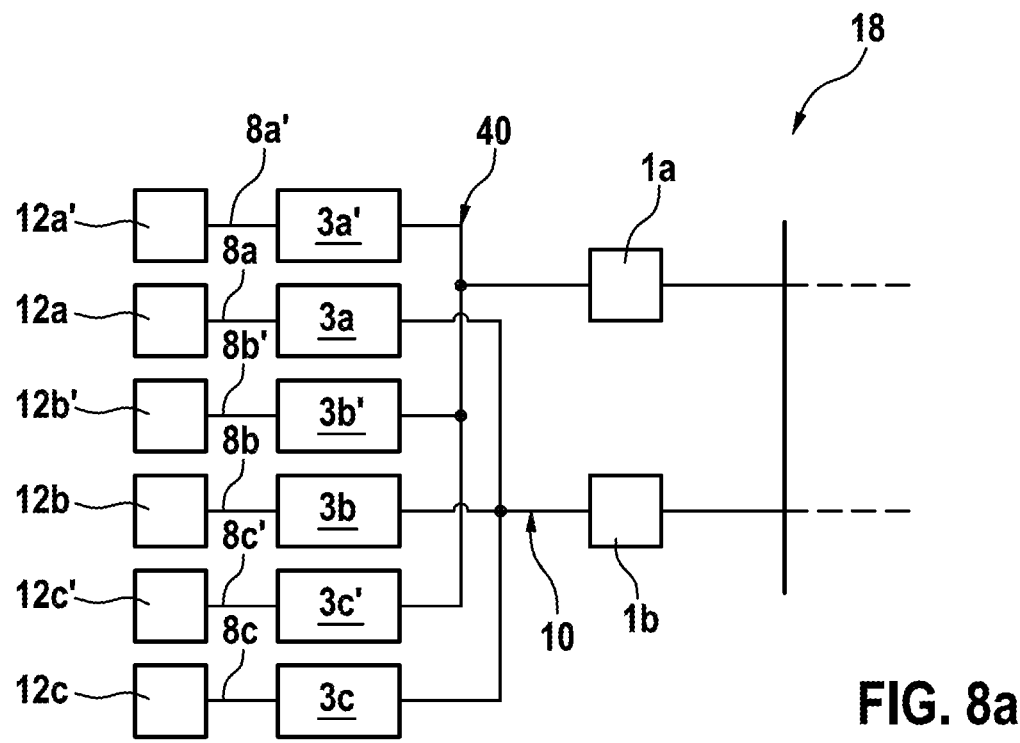
FIG. 8a shows an implementation of pixel addressing including two multichannel analog-digital converter devices according to the present invention.
Figure 8B:
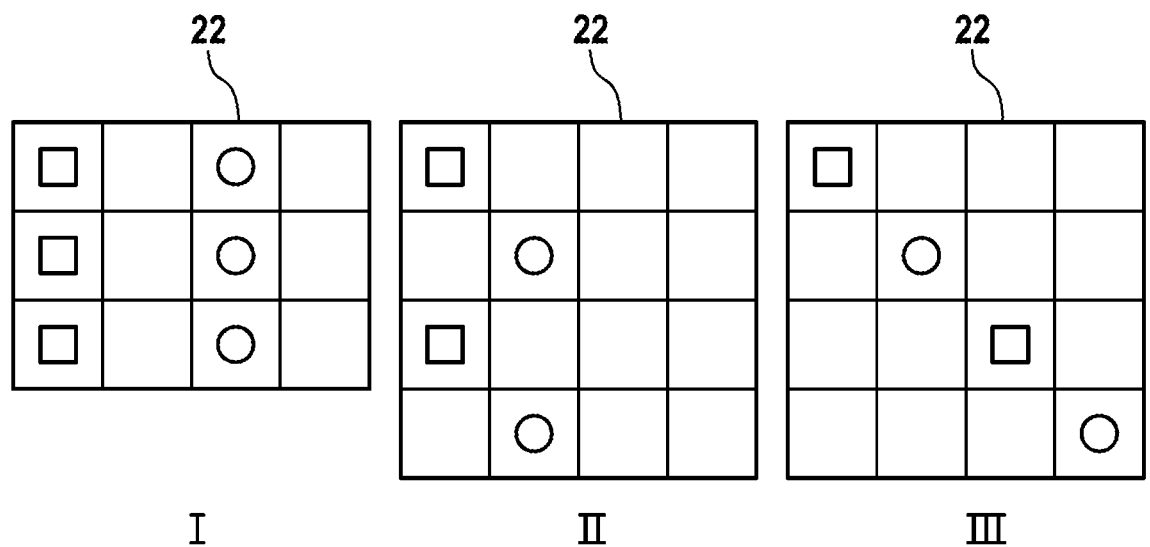
FIG. 8b shows pixel addressing including two multichannel analog-digital converter devices according to the present invention.

FIG. 8a shows one specific embodiment of a receiving unit 18 according to the present invention. Receiving unit 18 includes a first multichannel analog-digital converter device 10 and a second multichannel analog-digital converter device 40. First multichannel analog-digital converter device 10 includes first through third detection antennas 12a through 12c and first through third modulators 3a through 3b within first through third signal processing channels 8a through 8c. Detection antennas 12a through 12c of first multichannel analog-digital converter device 10 are situated in alternation with detection antennas 12a' through 12c' of second multichannel analog-digital converter device 40. In addition, each signal processing channel 8a' through 8c' of second multichannel analog-digital converter device 40 includes its own first through third modulator 3a' through 3c'. Due to the different configurations of first through third signal processing channels 8a' through 8c' of second multichannel analog-digital converter device 40, and of first through third signal processing channels 8a through 8c of first multichannel analog-digital converter device 10, different patterns of pixels may be addressed in a visual field 22. This is shown in particular in FIG. 8b. For example, two multichannel analog-digital converter devices 10, 40 may each address parallel columns, the square symbols shown in FIG. 8b in figure portion I being associated with first multichannel analog-digital converter device 10, and the circular symbols being associated with second multichannel analog-digital converter device 40. In addition, as shown in figure portion II in FIG. 8b, particular multichannel analog-digital converter devices 10, 40 may also address offset pixels of a visual field 22. Furthermore, the pixels may be addressed in diagonal alternation, as shown in visual field 22 of figure portion III.

Figure 9A:
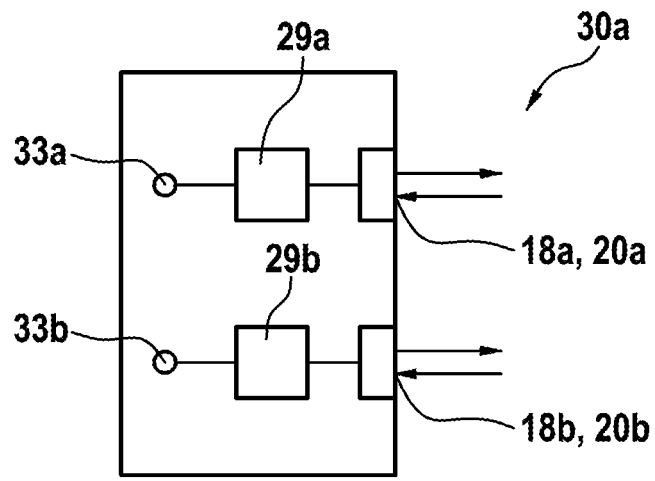
FIG. 9a shows a first variant of a transmitting and receiving unit according to the present invention.
Figure 9B:
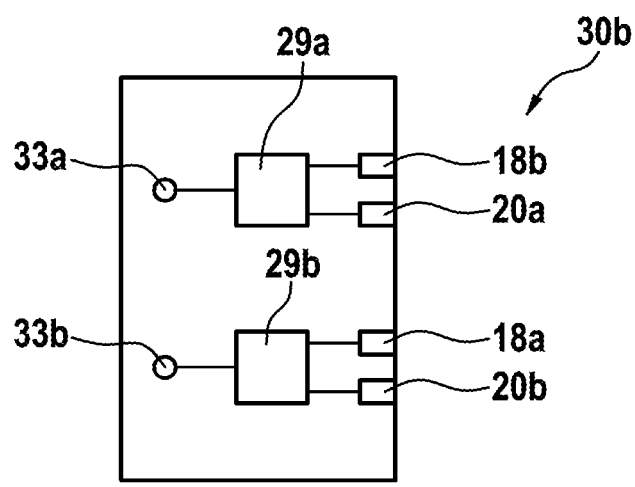
FIG. 9b shows a second variant of a transmitting and receiving unit according to the present invention.
Figure 9C:
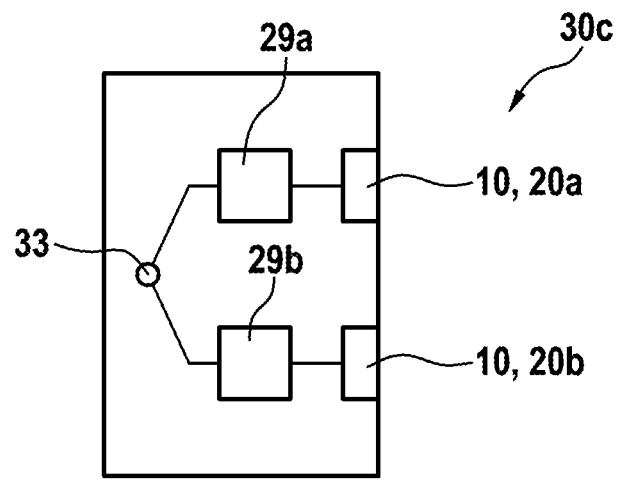
FIG. 9c shows a third variant of a transmitting and receiving unit according to the present invention.

FIG. 9a shows a first variant of a LIDAR sensor 30a according to the present invention. First and second laser sources 33a and 33b are situated in parallel. A first and a second circulator are respectively situated between laser sources 33a, 33b and first and second transmitting and receiving units 18a, 18b, 20a, 20b. Transmitting and receiving units 18a, 20a and 18b, 20b are in each case situated coaxially; i.e., the transmission signal and the reception signal are transmitted and received on the same channel. This is shown by the oppositely facing arrows at respective transmitting and receiving units 18a, 18b, 20a, 20b. In contrast, FIG. 9b shows a biaxial configuration of transmitting and receiving units 18a, 18b, 20a, 20b. In other words, the optical signals are received and transmitted on different channels. FIG. 9c shows one variant of FIG. 9a in which only a single laser source 33 is used, whose signals are split on the individual signal paths. For all variants, in particular the decoupling of the transmitted signal or the reception of the reflected signal may take place via a free beam system that includes decoupling optics and/or via an optical fiber that includes collimation optics, or in the case of photonically integrated systems, via a grating and/or edge couplers. In particular, the entire (FMCW) signal path may be implemented as a free beam system, as a fiber optics system, or as a PIC.

Figure 10A:
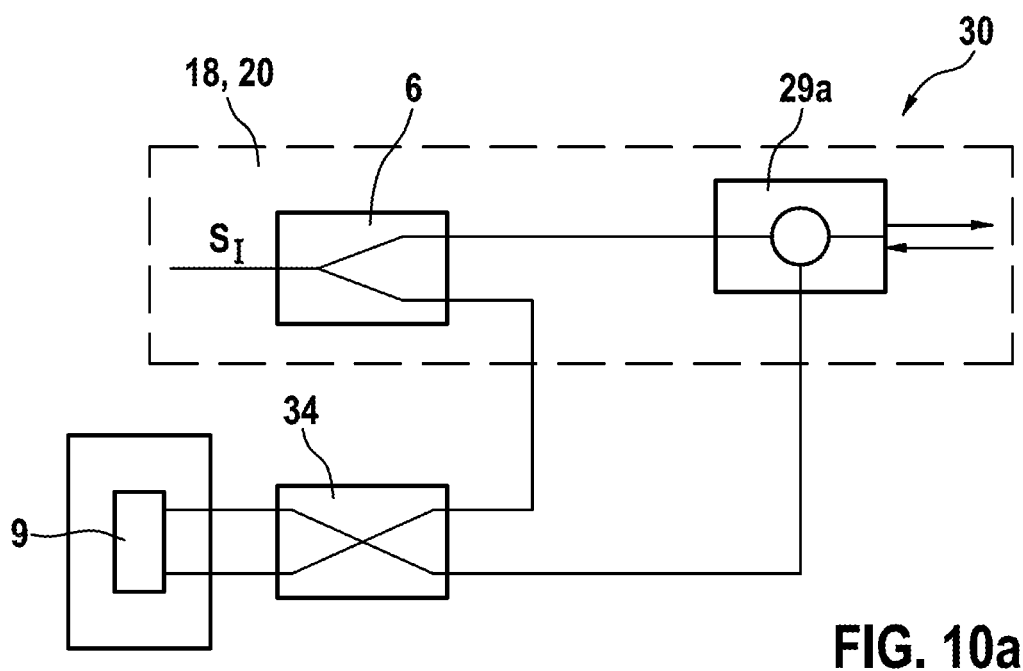
FIG. 10a shows one variant of a signal path according to the present invention.
Figure 10B:
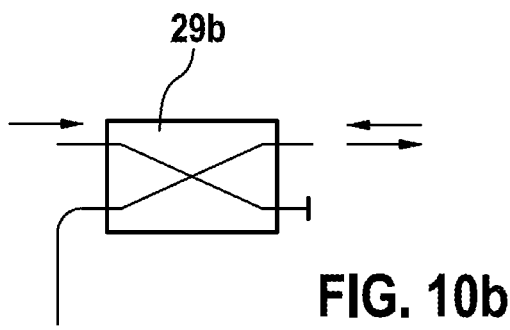
FIG. 10b shows one variant of a selective optical element.
Figure 10C:
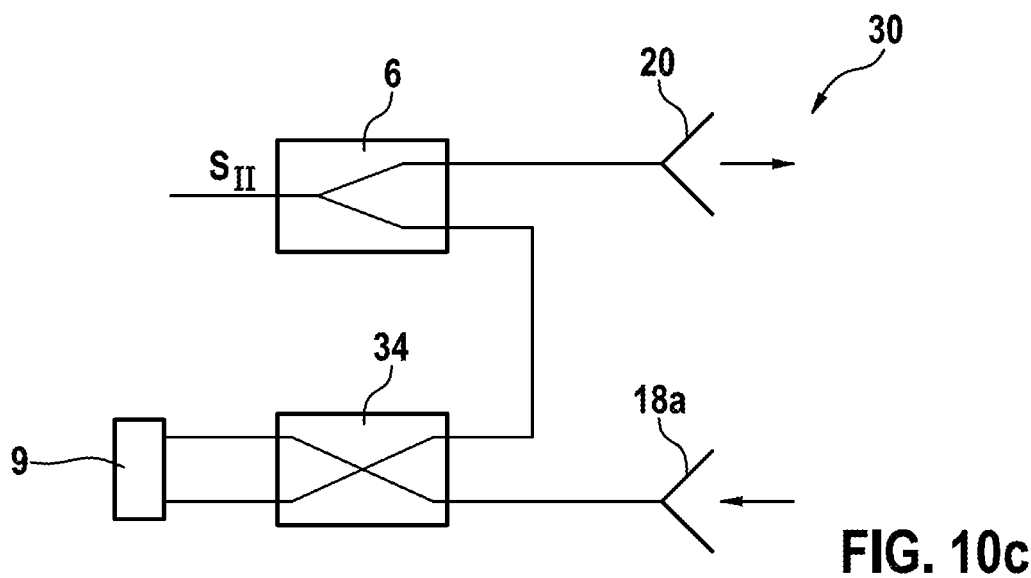
FIG. 10c shows another variant of a signal path according to the present invention.

FIGS. 10a and 10c respectively show variants of biaxial and coaxial signal paths of LIDAR sensor 30 according to the present invention. The operating principles of these variants correspond in particular to a Mach-Zehnder interferometer. The particular signal paths for an FMCW-based detection are illustrated. In particular, modulated reference signals that originate from signal input $S_I$ are branched from the transmission signal via a branching unit 6 in each case. In particular, a first selective optical element 29a, in particular a circulator, according to FIG. 10a may be provided in order to emit the transmission signal and to receive the reflected signal, as indicated in each case by the arrows. In addition, first selective optical element 29a may transmit the received signal to combining unit 34, in particular a coupler, combining unit 34 being configured for combining the modulated reference signal with the received signal, for example using a divider ratio of 50:50. The combined signals are subsequently led across a balanced detector 9. First selective optical element 29a, in the form of a circulator according to FIG. 10a, may also be replaced by second selective optical element 29b according to FIG. 10b, the signal channels running within second selective optical element 29b in a crossed-over manner instead of circularly.

FIG. 10c shows a biaxial variant of signal paths, receiving unit 18a being a detection antenna, and transmitting unit 20, spatially separate therefrom, including a transmitting antenna. The received and transmitted signals are combined with one another in a coupler 34 before being transmitted into a balanced detector 9.

Figure 11:
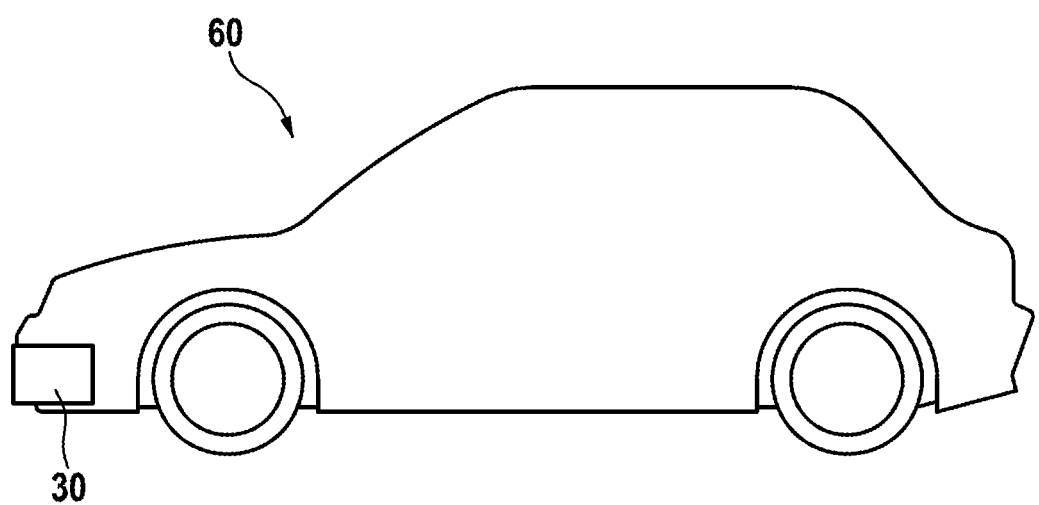
FIG. 11 shows one variant of a vehicle according to the present invention.

FIG. 11 shows one specific embodiment of a vehicle 60 according to the present invention that includes a LIDAR sensor 30 according to the present invention.

Figure 12:
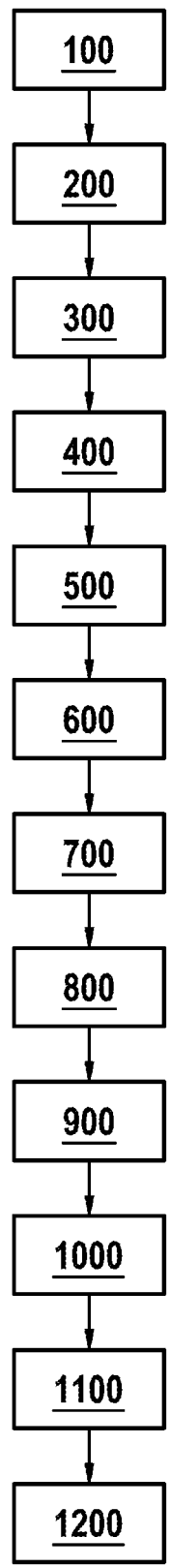
FIG. 12 shows a flow chart of one variant of the method according to the present invention.

FIG. 12 shows a flow chart of one specific embodiment of the method according to the present invention. A modulated optical signal is emitted with regard to multiple pixels of a visual field in a first step 100. The reflected modulated optical signals belonging to multiple pixels are received, via a plurality of signal processing channels 8a through 8d, via a multichannel digital-analog converter device 10 according to the first aspect of the present invention in a second step 200. The branched modulated reference signals of the modulated transmitted signal are combined with the received reflected optical modulated signal in a third step 300. The combined signals are modulated in a fourth step 400 in order to generate an individually encoded analog signal, it also being possible to carry out steps 300 and 400 in the reverse order corresponding to the above explanation. The individually encoded analog signals are superimposed with one another in a fifth step 500, and are transmitted into an analog-digital converter unit 1 and digitized in a sixth step 600. The measurements are repeated in a seventh step 700, depending on the number of pixels and the number of signal processing channels 8a through 8d, as described above. A transformation, for example a fast Fourier transform, is carried out for each measurement in an eighth step 800, resulting in M spectra (where M stands for the number of measurements) having up to N peaks (where the number of peaks stands for the number of pixels, with the assumption that no more than one target is to be detected per pixel). The transformation takes place in particular via a signal processor 13. The spectra are averaged and the positions of the N maxima are detected in a ninth step 900. The complex values of the N spectra at their positions are stored in a tenth step 1000. This results in M×N values. These M×N values are correlated with the original analog individual encoding sequence in an eleventh step 1100. The encodings with the highest correlation are associated with a particular peak in a twelfth step 1200. In this way, conclusions may be drawn concerning the pixel via the highest correlation with a peak.

Figure 13:
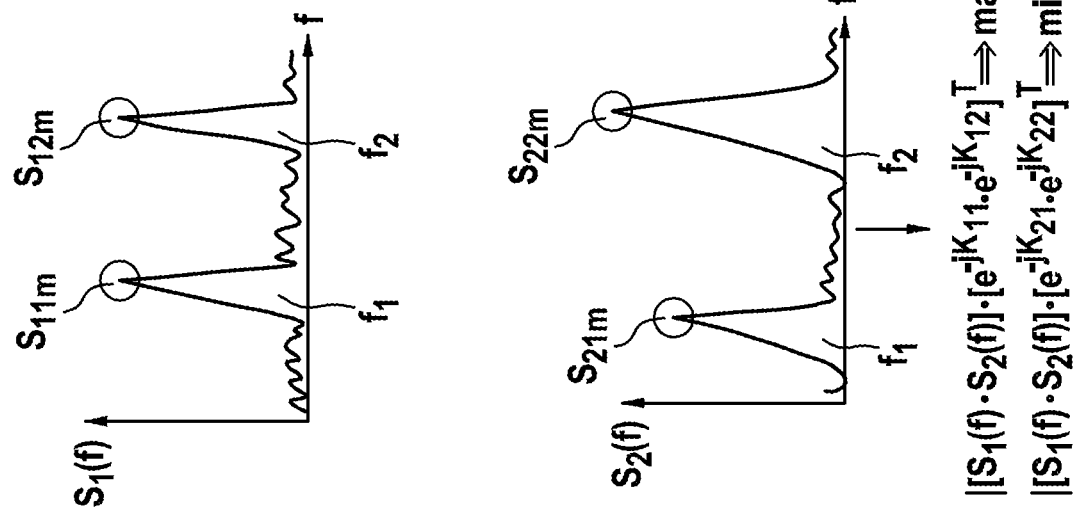
FIG. 13 shows an illustration of a signal association according to the present invention with the aid of a signal processor.
Figure 13:
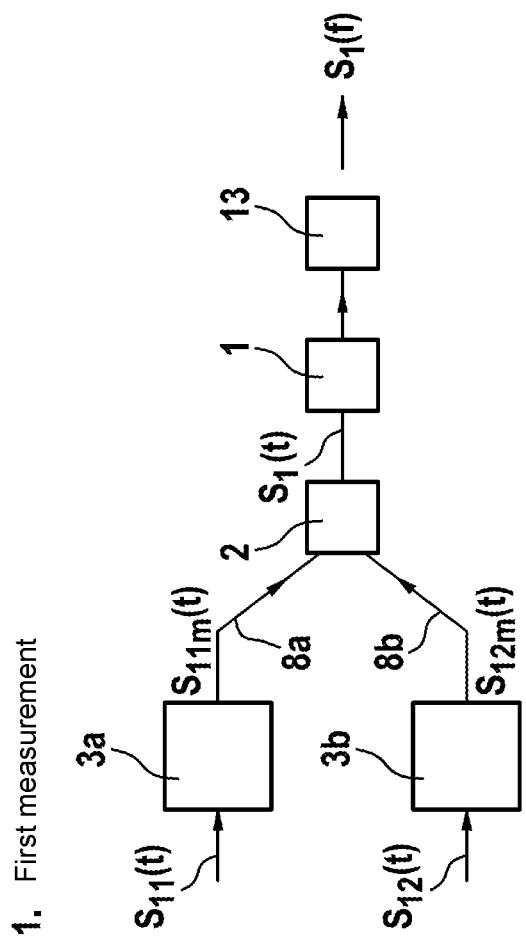
Figure 13:
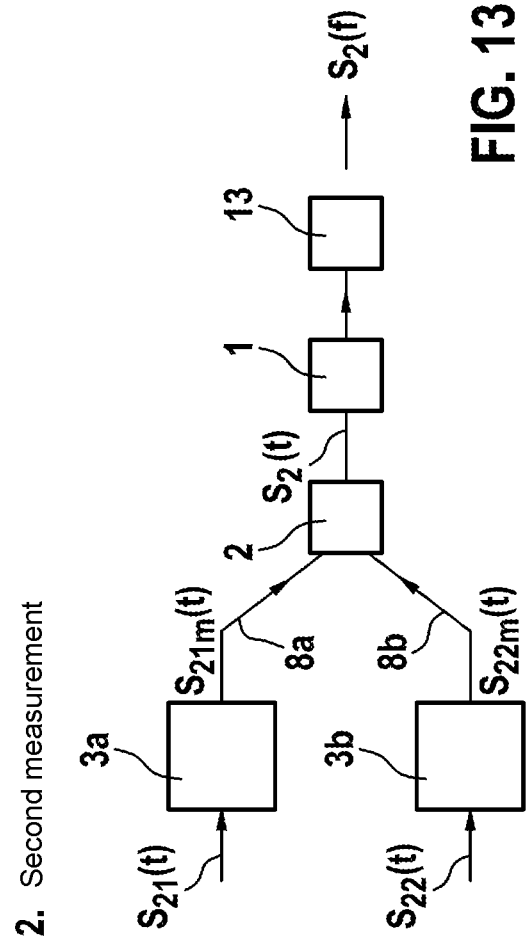

FIG. 13 illustrates a signal association according to the present invention with the aid of a signal processor 13. The signal association is shown for a simplified example of a multichannel analog-digital converter device 10 according to the present invention with two signal processing channels 8a, 8b that include two modulators 3a, 3b, respectively. A signal superimposition unit 2, an analog-digital converter device 1, and a signal processor 13 are connected in series downstream from signal processing channels 8a, 8b. A signal $S_{11}(t)$ or $S_{12}(t)$ is received by signal processing channel 8a, 8b, respectively, during a first measurement. Signals $S_{11}(t)$ and $S_{12}(t)$ are correspondingly modulated with phase encoding values $K_{11}$, $K_{12}$ by respective modulators 3a, 3b; modulated signals $S_{11m}(t)$ and $S_{12m}(t)$ may be mathematically expressed as follows:

$$S_{11m}(t) = S_{11}(t) \cdot e^{j \cdot K_{11}}$$

$$S_{12m}(t) = S_{12}(t) \cdot e^{j \cdot K_{12}}$$

"j" is the imaginary component of the exponential function. Based on the modulated signals, a summed signal $S_1(t) = S_{11m}(t) + S_{12m}(t)$ is created with the aid of signal superimposition unit 2. This summed signal $S_1(t)$ is digitized with the aid of analog-digital converter device 1 and subsequently subjected to a fast Fourier transform with the aid of signal processor 13 in order to obtain spectrum $S_1(f)$; spectrum $S_1(f)$, which results from the fast Fourier transform, is shown by way of example on the top right side of FIG. 4. A second measurement is carried out in the same way, the curve of the second measurement being described by the equations:

$$S_{21m}(t) = S_{11}(t) \cdot e^{j \cdot K_{21}}$$

$$S_{22m}(t) = S_{12}(t) \cdot e^{j \cdot K_{22}}$$

and $S_2(t) = S_{21m}(t) + S_{22m}(t)$. Corresponding spectrum $S_2(f)$, which results from the subsequent fast Fourier transform, is shown on the bottom right side of FIG. 4. The maxima are subsequently identified in corresponding spectra $S_1(f)$, $S_2(f)$ that result from the fast Fourier transform. The number of maxima correspond to the number of parallelized signal processing channels 8a, 8b, i.e., two in the present case. The complex amplitudes of these maxima contain the original phase encodings, and may be identified, for example, via a vector multiplication and formation of an absolute value, as shown in FIG. 13 below the downwardly directed arrow. If the maxima are noisy, more than two measurements may be carried out. For example, for 16 signal processing channels it is appropriate to carry out ten successive measurements, so that it is still possible to save measuring time compared to 16 individual measurements without parallelization. If phase values P increase linearly, with each signal processing channel 8a, 8b having a different slope of this underlying straight line, the computation may be simplified by replacing with the fast Fourier transform, since the above computation mathematically results in a fast Fourier transform for all signal processing channels and phase values.

What is claimed is:

1. An optoelectronic sensor, comprising:
   a transmitting unit to transmit a plurality of optical signals in each case to a plurality of segments of an object, segments of the plurality of segments being associated in each case with pixels of a visual field of the optoelectronic sensor; and
   a receiving unit having a first multichannel analog-digital converter device, including:
   an analog-digital converter unit;
   a plurality of signal processing channels, the signal processing channels of the plurality of signal processing channels in each case including:
   a detection antenna to receive a respective optical signal; and
   a modulator to generate an individual respective encoded signal; and
   a superimposition unit to generate a superimposed signal based on a superimposition of the encoded signal from each of the plurality of signal processing channels, wherein the superimposed signal is transmittable to the analog-digital converter unit.

2. The optoelectronic sensor claim 1, wherein the transmitting unit is configured to emit a flash illumination pattern and/or a pixel-by-pixel illumination pattern and/or a column-by-column illumination pattern and/or an illumination pattern with regard to the number of pixels that are associated with the signal processing channels of the first multichannel analog-digital converter device, with regard to the visual field of the optoelectronic sensor.

3. The optoelectronic sensor claim 1, wherein the transmitting unit includes a first diffractive optical element, the first diffractive optical element being for guiding, as a function of a variation of a wavelength that is emitted by the transmitting unit, an optical signal that corresponds to this wavelength and that is incident on the first diffractive optical element, in particular to various segments of the plurality of segments of the object.

4. The optoelectronic sensor claim 1, wherein the transmitting unit includes a first movable optical element, the first movable optical element being for transmitting an incident optical signal on various segments of the plurality of segments of the object, as a function of a proper motion.

5. The optoelectronic sensor claim 1, wherein the optoelectronic sensor for carrying out a direct runtime measuring process and/or a measuring process that includes a combination of frequency modulation and/or coherent detection.

6. The optoelectronic sensor claim 1, wherein the transmitting unit and the receiving unit are situated coaxially and/or biaxially with respect to one another.

7. The optoelectronic sensor claim 3, wherein the receiving unit includes a second diffractive optical element and/or a second movable optical element, the second diffractive optical element and/or the second movable optical element each being for guiding incident optical signals to the detection antennas of the signal processing channels.

8. The optoelectronic sensor claim 1, wherein the receiving unit includes at least one second multichannel analog-digital converter device.

9. The optoelectronic sensor claim 8, wherein the first multichannel analog-digital converter device for addressing pixels of the visual field that are in parallel and/or alternating and/or diagonally offset with respect to pixels that are addressable by the second multichannel analog-digital converter device.

10. A vehicle, comprising:
an optoelectronic sensor, including:
a transmitting unit to transmit a plurality of optical signals in each case to a plurality of segments of an object, segments of the plurality of segments being associated in each case with pixels of a visual field of the optoelectronic sensor; and
a receiving unit having a first multichannel analog-digital converter device, including:
an analog-digital converter unit;
a plurality of signal processing channels, the signal processing channels of the plurality of signal processing channels in each case including:
a detection antenna to receive a respective optical signal; and
a modulator to generate an individual respective encoded signal; and
a superimposition unit to generate a superimposed signal based on a superimposition of the encoded signal from each of the plurality of signal processing channels, wherein the superimposed signal is transmittable to the analog-digital converter unit.

11. A method for operating an optoelectronic sensor, the method comprising:
transmitting, using a transmitter of the optoelectronic sensor, a plurality of optical signals in each case to a plurality of segments of an object, segments of the plurality of segments being associated in each case with pixels of a visual field of the optoelectronic sensor;
receiving, using a receiving unit of the optoelectronic sensor, reflected optical signals with regard to multiple pixels of the visual field via a multichannel analog-digital converter device of the optoelectronic sensor, in each case via a signal processing channel of a plurality of signal processing channels of the multichannel analog-digital converter device;
modulating each of the received optical signals and/or an associated reference signal, using a respective signal processing channel of a plurality of signal processing channels of the multichannel analog-digital converter device, to generate a corresponding individually encoded analog signal in each case;
superimposing multiple individually encoded analog signals;
digitizing the superimposed individually encoded analog signals;
transforming the digitized signals; and
evaluating the transformed and digitized superimposed signals to associate them with a particular pixel of the plurality of pixels.

* * * * *